2 Sheets.
Sheet. 1.

S. W. Bullock.

Hay Press.

№ 65

Reissued Aug. 14. 1844.

PERSPECTIVE VIEW

S. W. Bullock.

Hay Press.

3 Sheets. Sheet 2.

№ 65.

Reissued Aug. 14. 1844.

ELEVATION

S. W. Bullock.

Hay Press.

3 Sheets
Sheet 3.

No 65.

Reissued Aug. 14. 1844.

UNITED STATES PATENT OFFICE.

S. W. BULLOCK, OF WILLIAMSBURG, NEW YORK.

IMPROVEMENT IN METHODS OF CONSTRUCTING PRESSES FOR PRESSING HAY, COTTON, &c.

Specification forming part of Letters Patent No. 2,507, dated March 23, 1842; Reissue No. 65, dated August 14, 1844.

*To all whom it may concern:*

Be it known that I, S. W. BULLOCK, late of Catskill, now of Williamsburg, county of Kings, State of New York, have invented a new and useful improvement and discovered a new principle in the manner of constructing presses, which may be applied to the pressing of a great variety of articles and to the lifting and moving heavy bodies that increase in weight or resistance as they move, and is specially applicable to the pressing of cotton, hay, and other substances which require a considerable range on the follower; and I do hereby declare the following is a full and exact description thereof.

Figure 1:
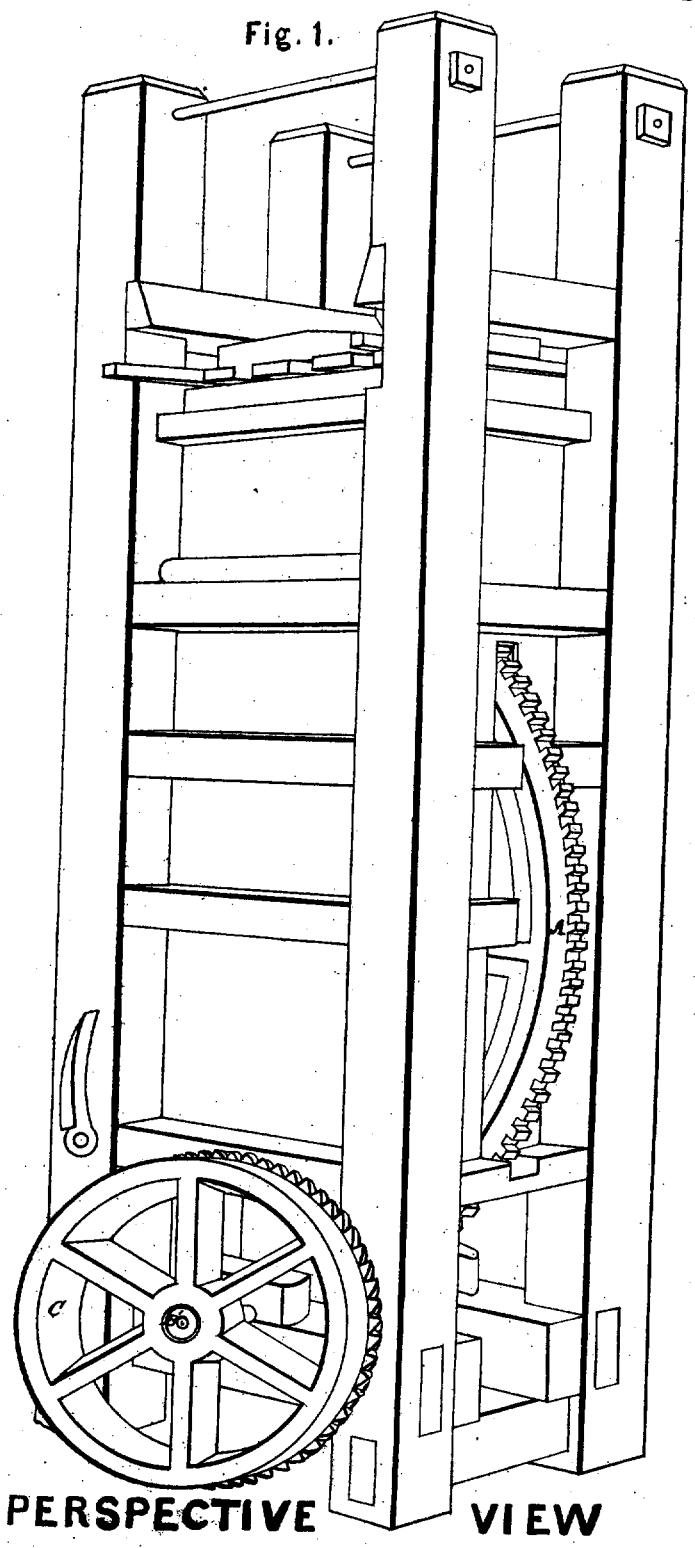
Figure 2:
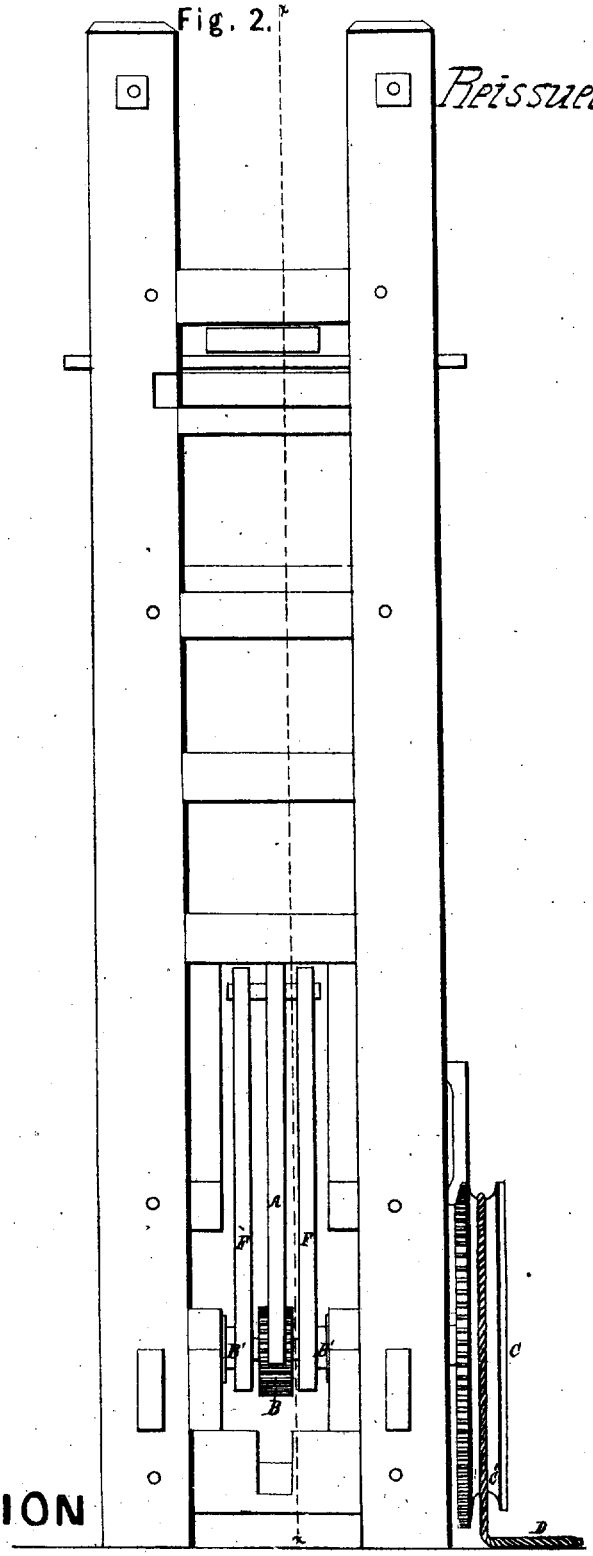
Figure 3:
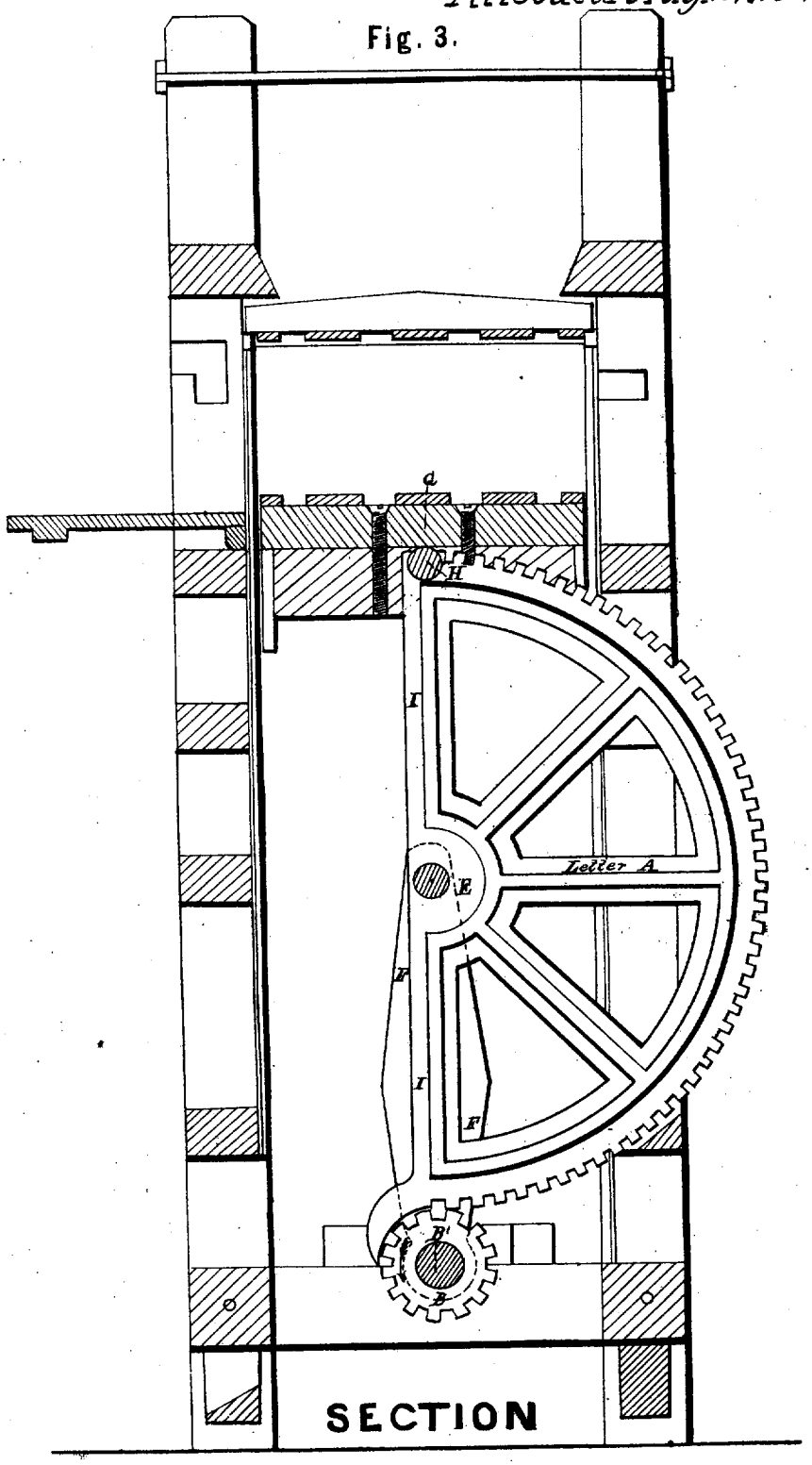

In the accompanying drawings, Figure 1 is a perspective view of press. Fig. 2 is a side elevation thereof, and Fig. 3 is a vertical section from side to side on the line *x x* of Fig. 2.

In each of these figures like parts are designated by the same letters of reference.

The frame-work of this press does not require any particular description, as it is similar to that of many others, the novelty consisting in the manner of constructing and arranging the parts by which the motive power is communicated to the follower.

In the drawings I have represented my press as adapted to the pressing of cotton, this serving equally well with any other object to exemplify the manner of its action.

I make a segment cog-wheel, A, which consists of a semicircle or half-wheel, into the teeth of which a pinion, B, is to mesh. This pinion is fixed on a shaft, B′, to which the power is to be applied.

C is a wheel on one end of the shaft B′, around which a rope or chain, D, may be wound on its grooved part C′, and to which rope or chain a horse or horses may be attached, and being driven off will consequently cause the wheel C to revolve. This wheel is represented as having its rim on one side formed into a ratchet, for the purpose of being checked by a pawl; but it may consist of a cog-wheel having a pinion working into it in the manner of the ordinary windlass.

The segment-wheel A does not turn upon a fixed axis, but has a short axis, E, passed through it, and this axis or fulcrum is supported on each side of the segment or lever on one end of two arms or supports, while the other end of said arms rest on the shaft B′.

G is the follower, and H a gudgeon, attached to the segment-wheel and received within proper boxes on the under side of the follower, which latter is shown at its greatest elevation in the press.

*Modus operandi.*—When the follower is to be depressed preparatory to using the press, the shaft B′ is turned in the direction of the arrow on the pinion B, by which means the side I I of the segment will be brought into a horizontal position, and the follower will be depressed to its lowest point. When it is desired to raise the follower for the purpose of pressing, the pinion B is to be turned in the reverse direction. This will produce an initial use on the follower equal in amount to that which would be produced were the pinion B operating upon a vertical rack; but the rapidity of this use will be perpetually decreasing and the power proportionally augmenting until the segment-wheel is brought into the position shown in Fig. 3, when the power will be at its maximum. The increasing force exerted on the follower is produced by the axis or fulcrum E changing its position in the movement of the segment or lever from a horizontal line with the gudgeon H to a perpendicular line, as shown in Fig. 3.

I have adopted the foregoing plan and description as best calculated to exemplify and show clearly the principle of my invention, aware that the same effect may be produced in a great variety of ways by means of the movable fulcrum and lever, but would necessarily involve the same principle.

Having thus fully explained the nature of my invention and shown the operation of my improved press, what I claim therein as new, and desire to secure by Letters Patent, is—

The manner in which I have constructed the press, as shown, by the combination of the segment-wheel A, with the pinion B and its shaft B′, the axis or fulcrum of the segment A being at the jointed part of the arms or other analogous devices that will allow of the axis or fulcrum moving from an acute angle to a straight line with the point on which the arms rest and the line on which the gudgeon H moves, and vice versa. In other words, I claim the invention or discovery of moving the axis or fulcrum of a wheel or lever in the simple act of operation of said lever or wheel, the axis or fulcrum of which is at the movable joint E, so as to produce a direct force against the object to be moved with all the advantages of the progressive power of the toggle-joint operated upon by an extended lever, the whole being combined and operating substantially in the manner herein set forth.

S. W. BULLOCK.

Witnesses:

LLOYD MINTURN,

SAML. H. GREEN.